United States Patent [19]

Lee et al.

[11] 4,380,471
[45] Apr. 19, 1983

[54] POLYCRYSTALLINE DIAMOND AND CEMENTED CARBIDE SUBSTRATE AND SYNTHESIZING PROCESS THEREFOR

[75] Inventors: Minyoung Lee, Schenectady; Lawrence E. Szala, Scotia; Roy E. Tuft, Guilderland Center, all of N.Y.

[73] Assignee: General Electric Company, Schenectady, N.Y.

[21] Appl. No.: 222,812

[22] Filed: Jan. 5, 1981

[51] Int. Cl.³ .............. B22F 3/14; B22F 7/00; C04B 31/16
[52] U.S. Cl. .................. 419/11; 75/230; 75/237; 51/307; 419/16
[58] Field of Search .............. 51/307, 308, 309; 72/272, 467, 107 A; 75/204, 201, 230, 236, 237; 407/119

[56] References Cited

U.S. PATENT DOCUMENTS

| | | | |
|---|---|---|---|
| 3,745,623 | 7/1973 | Wentorf et al. | 407/119 |
| 3,850,591 | 11/1974 | Wentorf, Jr. | 51/307 |
| 3,982,911 | 9/1976 | Lee | 51/308 |
| 4,063,909 | 12/1977 | Mitchell | 51/309 R |
| 4,108,614 | 8/1978 | Mitchell | 51/309 |
| 4,124,401 | 11/1978 | Lee | 51/307 |
| 4,156,329 | 5/1979 | Daniels | 51/309 |
| 4,167,399 | 9/1979 | Lee et al. | 51/307 |
| 4,173,614 | 11/1979 | Lee | 51/307 |
| 4,219,339 | 8/1980 | Wilson | 51/307 |
| 4,229,186 | 10/1980 | Wilson | 51/307 |
| 4,241,135 | 12/1980 | Lee | 51/308 |

FOREIGN PATENT DOCUMENTS 1489130 10/1977 United Kingdom.

Primary Examiner—L. Dewayne Rutledge
Assistant Examiner—J. J. Zimmerman
Attorney, Agent, or Firm—Leo I. MaLossi; James C. Davis, Jr.; James Magee, Jr.

[57] ABSTRACT

A polycrystalline diamond body infiltrated by a silicon atom-containing metal (e.g., silicon alloy) is bonded to a substrate comprising cemented carbide with a barrier of refractory material extending between the diamonds cemented together with silicon atom-containing binder and the substrate substantially precluding migration of the cementing medium (e.g., cobalt) from the carbide substrate into contact with the silicon atom-containing bonding medium in the diamond body. The process comprises subjecting a mass of diamond powder, a quantity of silicon atom-containing metal binder material, a cemented carbide body and a barrier made of material selected from the group consisting of tantalum, vanadium, molybdenum, zirconium, tungsten and alloys thereof to the simultaneous application of elevated temperature and pressure.

11 Claims, 4 Drawing Figures

POLYCRYSTALLINE DIAMOND AND CEMENTED CARBIDE SUBSTRATE AND SYNTHESIZING PROCESS THEREFOR

BACKGROUND OF THE INVENTION

1. Field of the Invention

This invention relates to a new and improved composite material structure and the process for synthesizing such structure. More particularly, the invention relates to a polycrystalline diamond body of which the particles are bonded together with silicon base alloy binder material and the diamond body in turn is united with a strong substrate material.

Heretofore, very hard and extremely wear-resistant polycrystalline diamond bodies have been produced using silicon base alloys as a binder. In situ bonding, however, of these polycrystalline diamond bodies on cemented carbide has presented a serious problem. Such compact structures are particularly desirable in that it affords greater strength and also requires less diamond in comparison with an equivalent size piece of material without such a substrate.

2. Description of the Prior Art

Exemplifying prior art relevant to the disclosed subject matter of the present application are U.S. Pat. Nos. 4,063,909 (Mitchell) and 4,167,399 (Lee et al.). The Mitchell patent, apparently, relates to an abrasive compact comprising diamond, for example, secured to a backing of cemented tungsten carbide or steel by a continuous layer of high temperature braze metal selected from titanium, chromium, manganese, vanadium, molybdenum, platinum, iron, cobalt, nickel, and alloys thereof. Lee et al. relates to a process for producing a polycrystalline diamond body by hot pressing a mass of silicon and a mass of diamond crystals in contact therewith, whereby molten silicon is caused to infiltrate interstices of the compacted diamond crystals and bond the diamond crystals together by a silicon atom-containing medium comprised of silicon carbide and silicon. As will be understood from the description presented hereinbelow, the disclosed subject matter is clearly distinguishable from the processes of the Mitchell and Lee et al. patents mentioned above.

SUMMARY OF THE INVENTION

It appears from applicants' studies that the silicon alloy in the diamond layer and the cobalt alloy in the cemented carbide are incompatible. The cobalt component from the cemented carbide attacks the bonding medium for the diamond, i.e., it apparently attacks the silicon carbide which is a critical element of the silicon alloy binder for the diamond body. Such attack leaves the boundary zone between the diamond body and its substrate a weak link in the composite. Therefore, in situ production of a silicon alloy-bonded diamond layer on a cemented carbide substrate requires that this binder incompatibility problem be overcome.

The present invention provides a new and improved polycrystalline diamond composite comprising a diamond body produced with silicon atom-containing metal as a binder, a substrate comprising cemented carbide having some cobalt, nickel or iron therein, and a barrier of refractory material extending between most of the opposed faces of the mass of diamonds cemented together by silicon atom-containing binder and the substrate containing cobalt, nickel or iron metal adjacent thereto. In the process for producing such new and improved compact, the barrier functions to substantially prevent migration of the cobalt, nickel or iron from the cemented carbide to the diamond mass being infiltrated with the silicon atom-containing metal.

In the following description in which cobalt-containing cemented carbide is referred to, it is to be understood that it is equally applicable to cemented carbide employing nickel or iron.

In the present invention in order to substantially preclude migration of the cobalt and/or the silicon alloy binder into contact with each other, a barrier is employed therebetween, made of a material, which in addition to surviving pressure/temperature exposure during the process, is further characterized as being able to form a strong bond with both the diamond layer and the substrate. Further, the barrier material should have relatively high strength, be able to withstand attack by silicon for a significant period of time and have a thermal coefficient of expansion somewhere between that of the diamond layer and the substrate.

Appropriate materials coming close to satisfying these several criteria are the refractory metals tantalum (Ta), vanadium (V), molybdenum (Mo), zirconium (Zr), and tungsten (W). The melting points of eutectic alloys formed with silicon by these metals are very close to the melting point of pure silicon itself and, consequently, they do not dissolve rapidly into molten silicon. These metals also react slowly with cobalt but will bond well with it.

The inventive concept set forth above has been carried out into practice both at pressure/temperature conditions under which diamond is, and is not, the stable form of carbon. Exemplary apparatus for conduct of the process of this invention under diamond-stable conditions is disclosed in U.S. Pat. No. 3,745,623—Wentorf et al. and U.S. Pat. No. 2,992,900—Bovenkerk. Both patents are incorporated by reference.

BRIEF DESCRIPTION OF THE DRAWINGS

The present invention will be readily and clearly understood by those skilled in the art upon reviewing the accompanying drawings in which.

DETAILED DESCRIPTION OF THE INVENTION

As will be further explained with reference to the drawings, various assemblies of diamond fines, silicon atom-containing metal binder, barrier material and cemented carbide are subjected to elevated pressure/temperature conditions to accommodate melting of the binder metal, infiltration thereof into the diamond mass and, at the same time, integration of the diamond mass with the cemented carbide as the substrate.

When hot pressing is employed, an assembly as described hereinabove is embedded in a pressure transmitting powder medium, preferably powdered hexagonal boron nitride (HBN), and the assembly/HBN composite is subjected to cold-pressing to convert this composite to a stabilized geometry. The resulting stabilized geometry is then subjected to hot-pressing in an appropriately sized die for a short time.

When operation is in the diamond-stable region, one or more assemblies are disposed in the reaction vessel of a superpressure apparatus as described in the Wentorf et al. or Bovenkerk patents in any of several arrangements. Thus, the composite of stabilized geometry (assembly plus HBN) prepared by cold-pressing can be transferred to a reaction vessel (with an appropriately sized liner therein, if required); one or more assemblies can be introduced into a salt liner in such a reaction vessel of appropriate dimension with a compressed disc of HBN placed directly underneath the assembly (i.e., adjacent the bottom of the refractory cup); or one or more assemblies can be introduced into a reaction vessel within an appropriately dimensioned liner of compressed HBN with compressed discs of HBN above and below each assembly.

Figure 2:
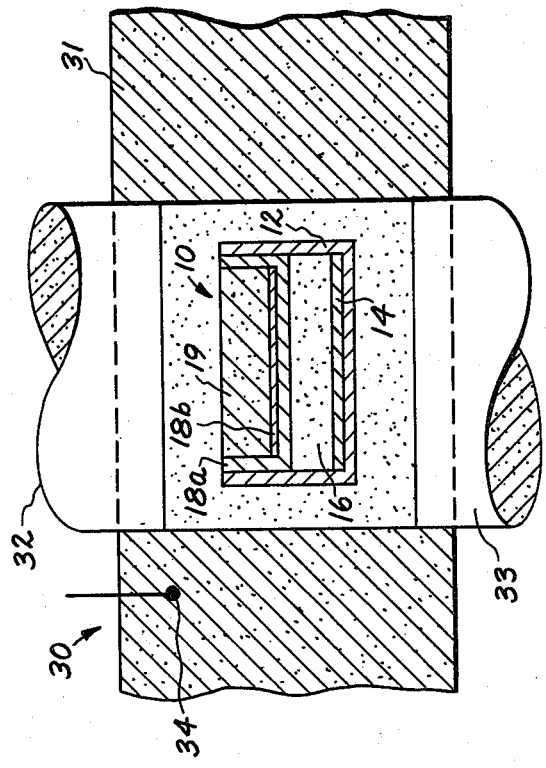
FIG. 2 is a schematic view similar to FIG. 1 with the pressure-transmitting medium, containment and constituents in a stabilized geometry transferred to a graphite pressure die for the simultaneous application of heat and pressure thereto, and FIGS. 3 and 4 display vertical sections through two other illustrative schematic arrangements for enclosing constituents for producing stabilized geometries in the practice of the disclosed invention.
Figure 1:
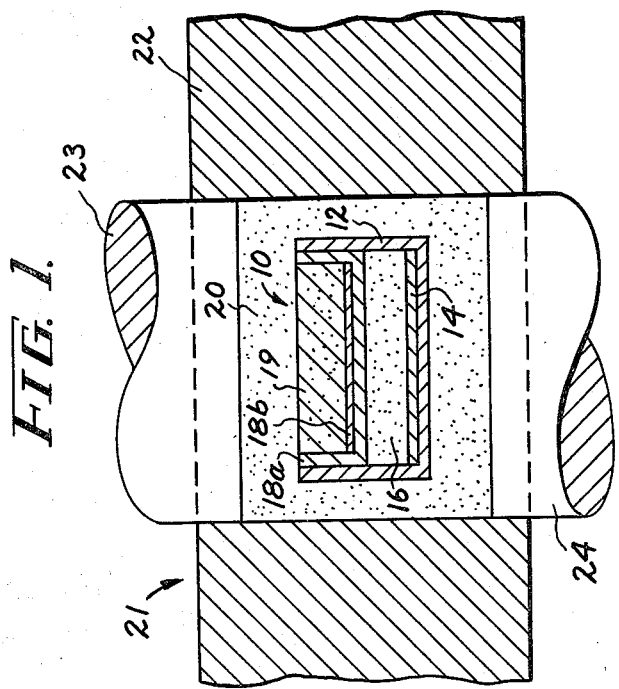
FIG. 1 is a vertical sectional view showing a schematic arrangement for containing and applying substantially isostatic pressure to the properly positioned constituents to be consolidated.

Referring now to the drawings, apparatus by which the process of this invention can be practiced by hot pressing (i.e., in the pressure/temperature regime in which diamond is not the stable form of carbon) is shown in FIGS. 1 and 2.

First, assembly 10 is prepared by loading a refractory metal cup (e.g., molybdenum cup 12) with a sheet 14 of silicon alloy, a layer 16 of diamond powder, a barrier (e.g., cup 18a made of metal selected from the group consisting of tantalum, vanadium, molybdenum and tungsten together with disc 18b of zirconium. Cup 18a is dimensioned to fit tightly into cup 12. The disc of zirconium in addition to functioning as part of the barrier also provides a useful gettering action. A disc 19 of cobalt cemented carbide is disposed in cup 12 in contact with disc 18b.

This assembly 10 is embedded in mass 20 of very fine particles, preferably in the size range from about 2 microns to about 20 microns, of a pressure transmitting powder medium, preferably hexagonal boron nitride, in pressure mold 21 (ring 22 and pistons 23, 24), preferably of tool steel. Cold pressing of the contents of the die is accomplished utilizing pressures greater than about 20,000 psi (about 1.38 kilobars), preferably about 50,000 psi (about 3.45 kilobars), to produce a stabilized geometry of the contents.

Having stabilized the geometry, the consolidated contents of die 21 is transferred as a packed mass from the steel die 21 to either an identical diameter graphite mold 30 (ring 31 and pistons 32, 33) for conduct of hot pressing or to a reaction vessel of identical internal diameter (not shown) for conduct of the balance of the process in the diamond-stable region. In the hot press apparatus 30 the consolidated assembly is simultaneously subjected (in a suitable furnace) to a pressure of about 10,000 pounds per square inch (about 0.69 kilobars) and temperature in excess of 1500° C. for about one minute to melt the silicon alloy sheet 14 and force the molten metal to infiltrate the interstices of the diamond powder 16. This heating-pressurizing step is conducted in an atmosphere of nitrogen, hydrogen or inert gas. Contact between the diamond particles and the molten silicon alloy produces silicon carbide around the individual particles. In larger interstices there may remain some unreacted silicon alloy. The result is a cemented dense polycrystalline diamond layer bonded to the cemented carbide substrate via a metal layer containing cobalt, zirconium, the metal of cup 18a and silicon. This resulting composite is useful as a cutting tool insert.

Hexagonal boron nitride densified around assembly 10 in the cold press step not only isolates the assembly from the graphite mold (FIG. 2), but also functions as the ultimate container for the assembly. Thus, if the molten silicon alloy attacks the metal containment and breaches it, the molten silicon alloy is contained by the dense boron nitride.

The temperature of the graphite die is monitored by means of thermocouple 34. The short period of time employed for the hot pressing step (e.g., about one minute) minimizes the risk of graphitization of the diamond. When operating under diamond-stable conditions of pressure and temperature (as in apparatus of the Wentorf et al. or Bovenkerk patents referred to hereinabove), this boundary condition does not exist.

Figure 3:
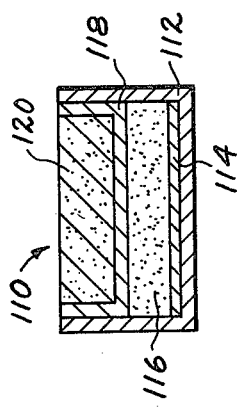

FIG. 3 illustrates a second arrangement for the initial assembly. Thus, assembly 110 is prepared using cup 112 of metal selected from the group consisting of tantalum, vanadium, molybdenum, zirconium, tungsten and alloys thereof. A disc 114 of silicon alloy is placed in the bottom of cup 112 and covered with layer 116 of diamond fines. Next, tight-fitting cup 118 is inserted in cup 112 to provide the requisite barrier in contact with diamond layer 116 and cobalt cemented tungsten carbide disc 120 is inserted in cup 118 to complete the assembly.

Figure 4:
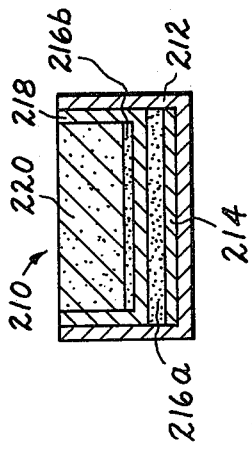

FIG. 4 illustrates still another arrangement for the initial assembly. This assembly has the limitation that the successful completion of the process of forming a composite (i.e., a tool insert) requires operation in the diamond-stable region. Assembly 210 comprises cup 212 containing silicon alloy 214 covered in sequence with first layer 216a of diamond powder, tight-fitting metal cup 218, second layer 216b of diamond powder covering the bottom of cup 218 and cobalt cemented tungsten carbide disc 220 in contact therewith. Barrier cup 218 is made of metal selected from the group consisting of tantalum, vanadium, molybdenum, zirconium, tungsten and alloys thereof.

Each of assemblies 110 and 210 can be embodied into stable geometries in the same manner, for example, as has been described for assembly 10. The stabilized geometry produced with assembly 110 can be processed thereafter by hot pressing or by operation in the diamond-stable region. As noted hereinabove, if a stabilized geometry is produced with assembly 210, this unit can only be processed by operation in the diamond-stable region to produce a useful composite. Alternately, any of the assemblies can be processed in the diamond-stable region after being cold-pressed with HBN.

After conduct of the simultaneous pressure and temperature application, preferably the outer metal cup is removed by machining from any of the processed assemblies. The composites so produced are useful as tool inserts.

The apparatus disclosed is exemplary and other apparatus able to carry out the requisite functions may be employed in the process of this invention.

Favorable results have been obtained in the following examples of the present invention where mixtures of diamond powder of grades designated as Grade 1 and Grade 2 were used. Grade 1 diamond powder includes particle sizes ranging from about 0 to 60 microns while Grade 2 diamond powder includes particle sizes ranging from about 2 to 4 microns. More specifically, for Grade 1 diamond powder, a typical sample has particle size content in terms of percent by weight as follows:

| Size in Microns (μ) | Percent by Weight |
| --- | --- |
| 45 < 60 | 0 to 5% |
| 30 to 45 | 24 to 31 |
| 20 to 30 | 25 to 35 |
| 10 to 20 | 20 to 30 |
| 10 > | 0 to 10 |

Various blends of diamond powder have been used successfully in carrying out the present invention including blends having 70% by weight of Grade 1 and 30% by weight of Grade 2. Such a blend will contain particle sizes ranging approximately from 1 micron to 60 microns with at least 40% by weight being smaller than 10 microns in size.

The cemented carbide used in the following examples and other tests conducted by applicants are indentified by grade as to their composition in the following table:

| | GENERAL ELECTRIC GRADES OF CARBOLOY® CEMENTED CARBIDE | |
| --- | --- | --- |
| | Composition by Weight/Percent | |
| Grade | Tungsten Carbide (WC) | Cobalt (Co) |
| 44A | 94 | 6 |
| 55A | 87 | 13 |
| 55B | 84 | 16 |
| 90 | 90 | 10 |
| 883 | 94 | 6 |
| 999 | 97 | 3 |

The preferred cementing agent is cobalt. As noted hereinabove, the use of nickel or iron as cementing agent is also encompassed within this invention.

The following examples are exemplary of the practice of this invention:

EXAMPLE 1

High Pressure-High Temperature

A 0.012" slug of silicon-30 rhenium alloy (by weight) was placed inside a 0.350" inner diameter (i.d.) zirconium cup; 200 mg diamond, Grade 1, fines was placed on top of the alloy; a 0.002" thick tight-fitting tantalum cup was inserted as a barrier into the zirconium (outer) cup; a 0.001" disc of zirconium was placed at the bottom of the tantalum cup; and a Grade 55A cemented carbide slug 0.125" thick of appropriate diameter for a tight fit was placed in the outer cup and over the zirconium disc.

The completed assembly was inserted into an appropriately dimensioned salt liner in the reaction vessel of a superpressure apparatus with a compressed disc of HBN in contact with the bottom of the refractory metal outer cup. The reaction vessel and its contents were then subjected to pressure and temperature conditions of about 57 kilobars and about 1500° C., respectively, for about 6 minutes.

The finished compact appeared to be well bonded. The diamond layer was well infiltrated with silicon alloy with no signs of deterioration due to cobalt leakage into this layer, thereby establishing the effectiveness of the Ta cup as a barrier, which was visible upon examination.

EXAMPLE 2

High Pressure-High Temperature

A 71 mg slug of silicon-30 rhenium was placed at the bottom of a 0.350" i.d. Zr cup; 200 mg of diamond powder, Grade 1, was placed on top of the alloy; a 0.002" thick tight-fitting Ta can was inserted into the outer Zr can with the Ta can having a slug of Grade 999 cemented carbide therein. The diameter of the cemented carbide slug provided for a tight fit in the Ta can.

The completed assembly was processed in the same manner as described in Example 1.

Close inspection of the finished compact showed that the diamond layer to be well bonded to the carbide substrate. X-ray determination for the presence of cobalt detected no cobalt in the diamond silicon alloy region.

EXAMPLE 3

High Pressure-High Temperature

A 0.014" silicon-30 rhenium disc was placed in a 0.350" i.d. Zr cup; 125 mg of Grade 1 diamond powder was placed on top of the disc. A second (inner) tight-fitting Zr cup 0.002" thick was then inserted in the outer Zr cup on top of the 125 mg layer of diamond. A second portion of Grade 1 diamond powder (50 mg) was disposed as a layer at the bottom of the inner cup, and a 0.125" thick slug of cemented carbide was placed over the second portion of diamond and tightly fitting in the outer Zr cup.

This assembly of ingredients (see FIG. 4) was introduced into superpressure apparatus as described in Example 1 and was subjected to the same pressure and temperature conditions as were used in Example 1 for about 6 minutes.

This compact also appeared to be well bonded. The diamond layer adjacent the cemented carbide (first diamond layer) had received cobalt therefrom and the diamond layer adjacent the Si-30Re disc (second diamond layer) was infiltrated with that material. The compact showed no evidence of interaction between the cobalt content of the first diamond layer and the silicon carbide of the second diamond layer.

EXAMPLE 4

Low Pressure-High Temperature

A disc of Si-30Re weighing 140 mg was placed in the bottom of a 0.350" i.d. Ta cup; 200 mg of diamond powder consisting of a blend (by weight) of 70% Grade 1 and 30% Grade 2 was placed on top of the metal disc; and a tight-fitting Zr cup containing a slug of Grade 999 cemented carbide tightly fit therein was inserted into the Ta cup on top of the diamond powder.

This assembly of material (see FIG. 3) was cold pressed in hexagonal boron nitride (HBN) powder to 90,000 pounds per square inch (about 6.21 kilobars). The assembly and HBN as a stabilized geometry was then hot pressed in a graphite die under a pressure of 11,000 pounds per square inch (0.76 kilobars) at a temperature of about 1550° C. for about one minute.

The resulting compact appeared to be well bonded to the cemented carbide via the surviving barrier metal with no noticeable damage from cobalt attack at the interface of the diamond layer, which itself was well infiltrated by the silicon-alloy binder.

In general some of the initial thickness of the barrier layer (i.e., 18a, 118, 218) will survive its initial composition (i.e., pure metal or alloy) although chemical reactions will have occurred at opposite major surfaces of that barrier layer facing the diamond and the cemented carbide. Due to these reactions at least a portion of the thickness of barrier metal will have been converted to the silicide (i.e., at the surface facing the diamond mass) and at least a portion of the thickness of barrier metal will have been converted to an intermetallic with the cementing agent (e.g., cobalt). The effectiveness of the barrier action was verified by the use of spot X-ray techniques. Thus, in experiments according to this invention using cobalt cemented tungsten carbide X-ray detection showed cobalt to be absent from the diamond layer in the completed tool insert.

The effect of cobalt intrusion in those instances in which a barrier layer is not used is shown by the following example:

EXAMPLE 5

High Pressure-High Temperature

A disc of Si-30Re weighing 270 mg was placed at the bottom of a 0.350" i.d. Zr metal cup. A layer of diamond fines (blend of 70 w/o Grade 1 and 30 w/o Grade 2) was placed on top of the alloy disc. A tight-fitting slug of 883 grade cemented carbide was inserted into the Zr cup into direct contact with the diamond.

This assembly was embedded in HBN powder and cold pressed to prepare a stabilized geometry of this combination of materials. This stabilized geometry (i.e., the assembly surrounded by HBN) was inserted into the reaction vessel of superpressure apparatus and was subjected to the simultaneous pressure/temperature/time conditions as in Example 1.

The diamond layer infiltrated well, but it had completely delaminated from the carbide slug.

Tungsten carbide is the preferred hard phase substrate material with tantalum carbide, titanium carbide, and nickel carbide and the like being optional substrate material.

FIGS. 1-4 are not representative of actual or proportional dimensions of the illustrated apparatus, compacts, or components thereof. The drawings have been prepared so as to facilitate description of the invention.

It will be obvious to those skilled in the art that various changes may be made without departing from the scope of the invention and the invention is not to be considered limited to what is shown in the drawings and described in the specification.

What is claimed is:

1. A process for simultaneously cementing diamond particles together and affixing the cemented diamond particles to a substrate comprising the steps of:
   (a) disposing within a refractory metal container a mass of silicon atom-containing metal, a quantity of diamond powder, a cemented carbide body and a layer made of a barrier material selected from the group consisting of tantalum, vanadium, molybdenum, zirconium, tungsten and alloys thereof, said layer of barrier material being disposed between said cemented carbide and at least a portion of said quantity of diamond powder and said quantity of diamond powder being disposed between said silicon atom-containing metal and said cemented carbide body to form an assembly, and
   (b) simultaneously applying heat and pressure to said assembly to melt said silicon atom-containing metal and cause said molten metal to infiltrate the diamond powder adjacent thereto and make contact with said layer of barrier material.

2. The process of claim 1 in which the temperature is about 1500° C. and the silicon atom-containing metal is a silicon-rhenium alloy.

3. The process of claim 1 in which the temperature is about 1500° C., the pressure is about 57 kilobars and a compressed disc of hexagonal boron nitride is disposed in contact with the assembly adjacent the quantity of silicon atom-containing metal.

4. The process of claim 3 wherein the diamond mass is divided into two portions by the layer of barrier material.

5. The process of claim 1 in which the layer of barrier material is zirconium metal.

6. The process of claim 1, wherein the assembly is cold pressed in hexagonal boron nitride powder to a pressure of about 6.21 kilobars before being subjected to simultaneous heat and pressure.

7. The process of claim 6, wherein the heat and pressure to which the assembly is subjected result in a pressure of about 0.76 kilobars and a temperature of about 1550° C.

8. A composite member produced by the process of claim 1.

9. A composite member comprising in combination a polycrystalline diamond mass cemented together by silicon atom-containing binder material, a cobalt-containing cemented carbide substrate, a mass of cobalt-containing bonded diamond fines bonded to said cemented carbide substrate and a layer disposed between said masses of diamond, said layer consisting of unconverted barrier material selected from the group consisting of tantalum, vanadium, molybdenum, zirconium, tungsten and alloys thereof and converted barrier material present as the silicide and as an intermetallic with cobalt, said silicide being disposed on the surface of said unconverted barrier material adjacent said silicon atom-containing diamond mass and said intermetallic being present on the opposite surface of said unconverted barrier material.

10. The composite member of claim 9, wherein the silicon atom-containing binder material comprises silicon-rhenium alloy and silicon carbide.

11. The composite member of claim 9 wherein the unconverted barrier material is zirconium.

* * * * *